UNITED STATES PATENT OFFICE.

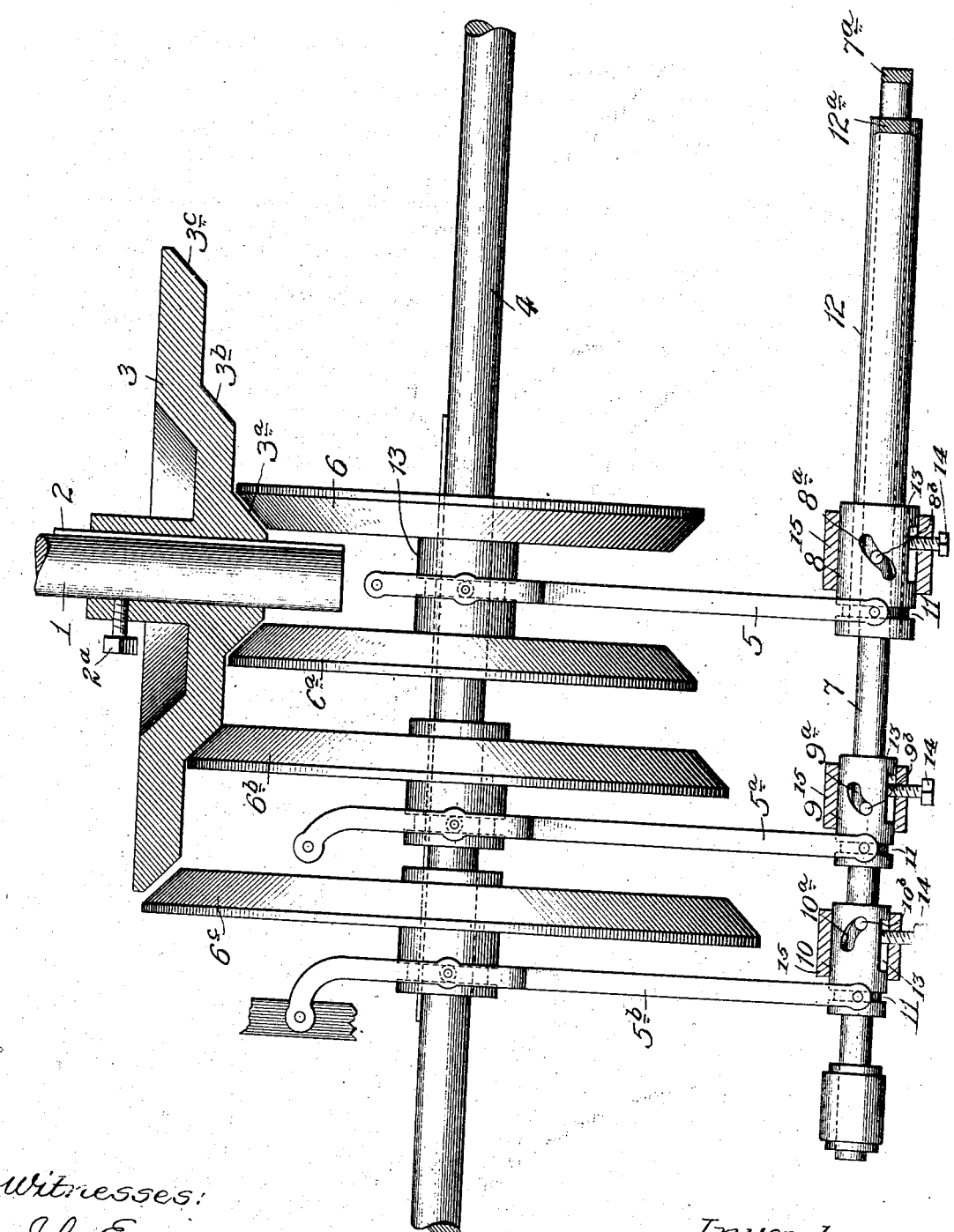

JOHN P. DAVIS, OF CHICAGO, ILLINOIS.

VARIABLE-SPEED GEAR.

No. 840,202.  Specification of Letters Patent.  Patented Jan. 1, 1907.

Application filed August 23, 1906. Serial No. 331,735.

*To all whom it may concern:*

Be it known that I, JOHN P. DAVIS, a citizen of the United States, residing at Chicago, in the county of Cook and State of Illinois, have invented a new and useful Improvement in Variable-Speed Gears, of which the following is a specification.

My invention relates to an improvement in the class of variable-speed gears in which the train consists of a series of coaxial gears integral with each other or relatively immovable on one rotary shaft, as the drive-shaft, these gears increasing in relative diameter from their common axis, and a series of gears mounted on the other rotary shaft, as the counter-shaft, and movable longitudinally thereof to engage each with and disengage it from one of the coaxial gears.

The primary object of my invention is to provide a novel construction of variable-speed gear in the class referred to which shall afford an unusually wide range of speed variations and permit a peculiar nicety of adjustment for any given speed.

The construction whereby these objects are accomplished is illustrated in the accompanying drawing by a broken plan view, partly in elevation and partly in section, showing a train of gears embodying my improvement.

On a rotary shaft 1, which is by preference the drive-shaft, is mounted to rotate with it, preferably by fastening it with a key 2 to adapt it to be adjusted lengthwise of the shaft, a stepped cone 3, forming about its center an inner beveled gear $3^a$; an intermediate similar gear $3^b$, and an outer similar gear $3^c$. The steps of the cone may be more or fewer than three to provide a greater or smaller number than represented of the coaxial beveled gears in different planes. A set-screw is shown at $2^a$ for fastening the stepped cone in any adjusted position on the shaft 1. A rotary shaft 4, which is the counter-shaft in the arrangement shown, carries to rotate with it one or more beveled gears, three sizes or diameters thereof being represented to correspond in number with the gears of the stepped cone. The gears 6, $6^a$, $6^b$, and $6^c$ on the shaft 4 are movable lengthwise thereof, each being equipped with a lever device of ordinary or any suitable construction for shifting it back and forth. The smaller gear is duplicated to form the similar connected beveled gears 6 and $6^a$ for engaging with the gear $3^a$ at diametrically opposite points thereof to drive the shaft 4 in either direction. The gears $3^a$ and 6 $6^a$ may be three-to-one gears, as represented, to drive the shaft 4 at one-third the speed of the shaft 1. The intermediate gear $3^b$ drives the gear $6^b$ at one to one-and-one-half speed, according to the representation in the drawing, and the gear $3^c$ drives the gear $6^c$ at one-to-one speed. My improvement, though not limited thereto, is more particularly intended for friction-gears, as represented. Obviously these relative speeds may be varied to any desired degree within a very wide range by increasing the number of steps forming beveled gears on the cone and the number of beveled gears on the shaft 4 to engage with the respective cone-gears, or by moving the stepped cone on its shaft farther toward or from the shaft 4 and providing the gears on the latter of suitable diameters to engage the respective cone-gears in such adjusted position thereof, or by both so increasing the number of steps and moving the stepped cone.

As will be seen, the stepped form of multiple gears on the shaft 1 affords, because of each occupying wholly a different plane from the other or others, complete or unlimited clearance for shifting the gears on the shaft 4 relative to the cone-gears, whereby these movable gears may be adjusted successively in place with the stepped cone secured or set in its operative position, and, as will also be apparent the stepped-cone form renders the multiple-gear formation more compact because of this extent of clearance than the construction as heretofore, in which corresponding gears are provided coaxially all in the same or substantially the same plane, requiring sufficient clearance for each counter-shaft gear within which to move it relative to the companion gear on the drive-shaft.

As one means for shifting the gears shown on the shaft 4 the construction shown in the drawing and described as follows is suitable: A rock-shaft 7, supported in suitable bearings to extend parallel with the shaft 4, is provided on one end with an operating lever or handle, (shown in cross-section at $7^a$) by which to turn it, and it is surrounded at proper intervals by longitudinally-shiftable non-rotatable tubular heads 8 9 10, each provided near one end with a circumferential groove 11. The head 8 is mounted to move longitudinally on a sleeve 12, surrounding and rotatably movable upon the shaft 7, and carries an operating lever or handle (shown in cross-section at 12ᵃ on its outer end.) In the head 8 is a slot 8 of approximate S shape, into which projects a stud 8ᵇ from the sleeve 12, and the heads 9 and 10 contain the arc-shaped slots 9ᵃ and 10ᵃ, respectively, curving in relatively opposite directions and into which project studs 9ᵇ and 10ᵇ. A shifting-lever 5, fulcrumed at one end and engaging at its opposite end the groove 11 in the head 8, is pivotally connected between its ends with the hub 13 common to the two gears 6 and 6ᵃ, and similar levers 5ᵃ and 5ᵇ engage, respectively, at their ends opposite those at which they are fulcrumed with the heads 9 and 10 at their contained grooves 11 and are pivotally connected, like the lever 5, with the hubs of the gears 6ᵇ and 6ᶜ. Thus by manipulating the handle 12ᵃ to turn the sleeve 12 in one direction or the other from the normal position illustrated (in which the stud 8ᵇ is central in the slot 8ᵃ) the stud in turning will act against the slot to move the head 8 longitudinally in the direction to move the lever 5 on its fulcrum to shift one of the gears 6 or 6ᵃ into engagement with the gear 3ᵃ, depending on the direction of turning the handle 12ᵃ. In the same way turning the handle 7ᵃ effects shifting in contrary directions of the gears 6ᵇ and 6ᶜ relative to their companion gears 3ᵇ and 3ᶜ by turning the rock-shaft 7 to cause the studs 9ᵇ and 10ᵇ through their engagement with the slots 9ᵃ and 10ᵃ to move longitudinally the heads 9 and 10 and move the levers 5ᵃ and 5ᵇ. Which of the gears 6ᵇ 6ᶜ is engaged with or disengaged from its companion gear by turning the handle 7ᵃ depends, as will be apparent, upon the direction of turning.

As means for preventing rotation of the longitudinally-movable heads 8, 9, and 10 each may be provided with an external longitudinal groove, as indicated at 13, at which to be engaged by a screw or stop, like that indicated at 14 as engaging the groove in the head 10, each said stop being supported in a suitable bearing, as indicated at 15.

What I claim as new, and desire to secure by Letters Patent, is—

1. A variable-speed gear comprising, in combination, a rotary shaft, a stepped cone on said shaft with the steps forming coaxial beveled gears each occupying wholly a different plane from the other or others, a second rotary shaft, a plurality of beveled gears of varying diameters mounted on said last-named shaft to rotate with it and be movable longitudinally thereof into and out of engagement with the gears of said cone, and means for shifting said movable gears.

2. A variable-speed gear comprising, in combination, a rotary shaft, a stepped cone mounted on said shaft to rotate with it and be adjustable lengthwise thereof, with the steps forming coaxial beveled gears each occupying wholly a different plane from the other or others, a second rotary shaft, a plurality of beveled gears of varying diameters mounted on said last-named shaft to rotate with it and be movable longitudinally thereof into and out of engagement with the gears of said cone, and means for shifting said movable gears.

JOHN P. DAVIS.

In presence of—
L. HEISLAR,
J. H. LANDES.